US008702060B2

(12) United States Patent
Björklund

(10) Patent No.: US 8,702,060 B2
(45) Date of Patent: Apr. 22, 2014

(54) LIFTING DEVICE

(75) Inventor: Arne Björklund, Tidaholm (SE)

(73) Assignee: Euromaint AB, Solna (SE)

( * ) Notice: Subject to any disclaimer, the term of this patent is extended or adjusted under 35 U.S.C. 154(b) by 323 days.

(21) Appl. No.: 13/060,786

(22) PCT Filed: Sep. 1, 2009

(86) PCT No.: PCT/EP2009/061240
§ 371 (c)(1),
(2), (4) Date: Feb. 25, 2011

(87) PCT Pub. No.: WO2010/028979
PCT Pub. Date: Mar. 18, 2010

(65) Prior Publication Data
US 2011/0147686 A1 Jun. 23, 2011

(30) Foreign Application Priority Data
Sep. 9, 2008 (EP) .................................... 08163974

(51) Int. Cl.
*B62B 3/06* (2006.01)
*A62B 3/00* (2006.01)

(52) U.S. Cl.
USPC ......................................... 254/93 R; 254/2 R

(58) Field of Classification Search
USPC ..................................... 254/37, 38, 93 R, 33
See application file for complete search history.

(56) References Cited

U.S. PATENT DOCUMENTS

| | | | | |
|---|---|---|---|---|
| 1,220,222 A * | 3/1917 | Grisinger | ........................ | 254/33 |
| 1,357,371 A * | 11/1920 | Wojtkiewicz | ................ | 104/273 |
| 1,391,379 A * | 9/1921 | Gohlke | ......................... | 384/611 |
| 2,622,374 A | 12/1952 | Stanley | | |
| 2,980,035 A * | 4/1961 | Cole et al. | .................... | 104/273 |
| 3,203,286 A | 8/1965 | Dombrowski | | |
| 3,345,890 A | 10/1967 | Dombrowski | | |
| 3,473,270 A | 10/1969 | Byrnes et al. | | |
| 3,540,164 A | 11/1970 | Deceuster | | |
| 3,598,017 A | 8/1971 | Saari | | |
| 3,828,689 A | 8/1974 | Raffenberg | | |
| 3,828,690 A * | 8/1974 | Stewart et al. | ............... | 105/90.2 |
| 4,068,823 A | 1/1978 | Belanger | | |

(Continued)

FOREIGN PATENT DOCUMENTS

| | | |
|---|---|---|
| CN | 2846389 Y | 12/2006 |
| EP | 0332489 A1 | 9/1989 |

(Continued)

OTHER PUBLICATIONS

LLC "Izdatelstvo Astrel", Big illustrated encyclopedia: Science and technology, 2002, 2 pages.

(Continued)

*Primary Examiner* — Lee D Wilson
*Assistant Examiner* — Nirvana Deonauth
(74) *Attorney, Agent, or Firm* — Maine Cernota & Rardin

(57) ABSTRACT

The present invention relates to a device for lifting a rail-based vehicle while the vehicle is standing on a rail. The device comprises a supporting frame adapted to at least in part rest on the rail, and a lifting member adapted to apply a lifting force on the rail-based vehicle in order to lift at least one wheel of the rail-based vehicle from the rail.

14 Claims, 2 Drawing Sheets

(56) References Cited

U.S. PATENT DOCUMENTS

| | | | | |
|---|---|---|---|---|
| 4,276,793 | A | 7/1981 | Wirtz | |
| 4,805,875 | A * | 2/1989 | Jackson et al. | 254/2 R |
| 6,769,365 | B1 | 8/2004 | Ward | |
| 2004/0188662 | A1 | 9/2004 | Shah | |
| 2008/0146397 | A1* | 6/2008 | Drake | 475/206 |
| 2010/0154606 | A1* | 6/2010 | Thyni | 82/105 |

FOREIGN PATENT DOCUMENTS

| | | | |
|---|---|---|---|
| GB | 329202 | | 5/1930 |
| GB | 2377258 | A | 1/2003 |
| JP | 2002104187 | A | 4/2002 |
| RU | 31552 | | 8/2003 |
| SU | 458476 | | 1/1975 |
| WO | 2008002261 | A1 | 1/2008 |

OTHER PUBLICATIONS

PCT Search Report dated Aug. 10, 2007 of Patent Application No. PCT/SE2007/050457, Jun. 21, 2007.

PCT Search Report for PCT Application No. PCT/EP2009/061240, Nov. 11, 2009, 2 pages.

* cited by examiner

LIFTING DEVICE

RELATED APPLICATIONS

This application is a national phase application filed under 35 USC §371 of PCT Application No. PCT/EP2009/061240 with an International filing date of Sep. 1, 2009, which claims priority of EP Patent Application 08163974.2 filed Sep. 9, 2008. Each of these applications is herein incorporated by reference in their entirety for all purposes.

FIELD OF THE INVENTION

The present invention relates to a device for lifting a rail-based vehicle while the vehicle is standing on a rail. The device comprises a supporting frame adapted to at least in part rest on the rail, and a lifting member adapted to apply a lifting force on the rail-based vehicle in order to lift at least one wheel of the rail-based vehicle from the rail.

BACKGROUND OF THE INVENTION

The wheels of rail-bound vehicles are provided with special wheel profiles along their circumferences, in order to fit the rail. The circumference of the wheel comprises a treading bearing on the rail and a flange projecting inside the rail in order to hold the rail-bound vehicle onto the rail. The wheels of the rail-bound vehicle are usually arranged in pairs, and the two wheels in one wheel-pair are rigidly connected with each other by a wheel-shaft. The two wheels of a wheel-pair thus usually rotate with the same rotation velocity.

Damages on a wheel may cause damages on the rail or may cause the rail-bound vehicle to go off the rail. The vehicle must therefore be taken to a repair shop in which the vehicle is lifted, after which the wheel-pair with the damaged wheel is replaced. The removed wheels may then be turned in a lathe so that the wheel profile once again becomes correct.

Document U.S. Pat. No. 4,276,793 shows a lathing device arranged to turn a wheel without prior removal of the wheel. The vehicle is lifted slightly so that the wheel can rotate and the lathing equipment is positioned beneath the vehicle in a pit under the rail. Due to the weight of the vehicle, having an axle pressure of about 25 ton, the device is very large and heavy and can only be provided in a repair shop. This is a problem since wheel-bound vehicles are often damaged when the vehicle is out in the field, wherein the vehicle can become stranded. Mobile lifting cranes has therefore been conceived for lifting the vehicle and changing a wheel-pair out in the field. However, modern cargo wagons are not built to be lifted while loaded, wherein for example a cargo wagon first needs to be emptied before the wagon can be lifted by the crane. Thus the time for a stand still becomes very long.

Trials have been made to manufacture lathing devices adapted for turning railroad wheels while the wheel remains on the vehicle and when the vehicle remains out in the field. One problem with such lathes and lifting devices is that it must be possible to fit the devices underneath the vehicle. A further problem is that some kind of reference for the turning of the wheels is needed.

One example of a device addressing these problems is shown in WO 2008/002261 showing a combined turning and lifting device. The device comprises a wedge pushed underneath the wheels for lifting the wheels from the rail. The wedge further comprises a roll adapted to make contact with the wheel, so that the wheel may be rotated and turned while standing on the wedge. One problem with this device is that if the wheel is heavily damaged vibrations will be created in the wheel when the roll encounters the damaged area. Hence variations will be introduced during the turning of the wheel meaning that the required tolerances may not be met. Another drawback with this device is that the roll-bearings must be very large in order to withstand the weights of heavy rail-based vehicles, such as cargo-wagons.

SUMMARY OF THE INVENTION

One object of the present invention is to indicate a device for lifting a rail-based vehicle while the vehicle is standing on a rail, and which simplify simultaneous turning of the wheels of the vehicle.

Another object of the present invention is to indicate a device for lifting a rail-based vehicle when the vehicle is out in the field.

These and other objects are achieved with the device for lifting as described in the preamble of claim 1, and which is characterized in that the supporting frame comprises a least a first resting member arranged to rest in a first position on the rail and a second resting member arranged to rest in a second position on the ground.

Since the supporting frame rests on the rail in at least one position a secure reference point is obtained. This simplifies the determination of the height the vehicle has been lifted, which is important when the wheel is to be turned in a lathe. Furthermore, a large part of the force from the weight of the vehicle may be directed down into the rail, which ensures that the supporting frame will not move due to sinking into the ground or similar. Hence the lifting device also will be more stable and more resistant towards vibrations. The second resting member resting on the ground is adapted to absorb possible moments, shearing forces, or torques applied onto the supporting frame while turning the wheels. If such moments or torques were carried into the rail the rail may break at its weak web, since most rails are not adapted for withstanding moments or shearing forces.

By letting the supporting frame rest on both the ground and on the rail it is also possible to arrange the lifting member on one side of the rail instead of on top of the rail. The rail usually has a substantial height and by arranging the lifting member to one side of the rail the lifting member may be made longer and thus stronger. Furthermore, the lifting member may be positioned more freely in relation to the rail-based vehicle. Preferably the lifting member is arranged to lift the vehicle at specifically designed lifting brackets, which on wagons are usually arranged beside the wheels, and thus also beside the rails. Preferably the lifting member is positioned and designed to lift the vehicle against the wheel-box of the vehicle. Preferably the first and the second resting members are spaced apart, and the lifting member positioned between them such that about 10-30% of the weight of the vehicle is carried into the ground and about 70-90% of the force is carried into the rail. In the event that the supporting frame is fitted with more than two resting members the force may of course be divided between the respective resting members, but the preferred ratio between the rail-to-ground force is believed to remain.

According to one embodiment of the invention the supporting frame comprises a third resting member arranged to rest on the ground or on the rail in at least one third position, which third position is displaced perpendicularly to and at a distance of at least 25 cm from a line through the first and the second positions. Preferably the third position is displaced at least 30 cm from said line, and preferably no more than 1 m from said line. Thus the supporting frame rests on the ground and/or on the rail in at least three positions, which gives much better stability to the supporting frame. By letting the third position be displaced perpendicularly to a line through the first and the second positions, the supporting frame is designed to absorb forces and moments in all directions.

According to one embodiment the third resting member is arranged to rest on the rail in the third position. Thus an even better determination of the position of the supporting frame, and thus of the vehicle, is achieved, which is advantageous in order to allow turning of the wheel. Preferably the resting members are arranged on either side of a wheel when the device is mounted on the rail. Preferably, the lifting member is also fixed to the supporting frame on a middle line passing between the first and the third resting members, so that the device becomes more stable against being overturned. Each resting member then also carries a smaller part, in this instance half, of the weight of the vehicle, so that the resting members may be made weaker. This is advantageous since there is usually only little space available for the resting members. By arranging two spaced apart resting members in contact with the rail the device also becomes more stable towards slipping, than if the third resting member were arranged to rest on the ground. In another embodiment the supporting frame may also comprise a fourth or a fifth resting member arranged to rest on the rail or on the ground.

According to a further embodiment the supporting frame comprises an adjustment member arranged for adjusting the vertical position of the second resting member relative to the supporting frame. By adjusting the vertical position of the second resting member relative to the supporting frame it is possible to adjust the height of the supporting frame above the ground. Since the supporting frame at the same time is arranged at a fixed height over the ground at the location of the rail due to the first and third resting members, the angle of the supporting frame relative to the ground is also adjustable. By adjusting the angle of the supporting frame relative to the ground it is also possible to adjust the angle of the lifting member. Hence the lifting member may be supported at a fixed angle in said supporting frame, giving the advantage of a stronger joint between the supporting frame and the lifting member.

According to one embodiment the supporting frame comprises a level measurement member adapted to estimate the angle of the supporting frame relative to the horizontal. By including a level measurement member the angle of the device relative to the horizontal may be estimated, which simplifies the mounting of the device at the correct angle. This is important in order to lift the vehicle in a desired lifting direction. In case the lifting member is arranged with a fixed angle in relation to the supporting frame it is necessary to arrange the supporting frame in a correct angle relative to the horizontal. In this case the level measurement member may be fixedly arranged on the supporting frame. Alternatively the angle measurement member may be fixedly arranged on the lifting member. In yet another embodiment the level measurement member may be separate from the supporting frame and lifting member. Preferably the level measurement member comprises a bubble level.

According to one embodiment of the invention the supporting frame comprises a holding member aligned with the level measurement member and adapted to support and hold the lifting member. Preferably the holding member is adapted to hold the lifting member at a perpendicular angle in relation to the level measurement member. Thus, when the level measurement member is aligned with the horizontal the lifting member will be aligned with the vertical. Thus, it is easy to align the lifting member with a desired lifting direction.

According to one embodiment of the invention the lifting member comprises a fixed base and a movable lifting element arranged to move in relation to the fixed base in order to apply the lifting force on and move the vehicle, wherein the lifting member further comprises a locking element arranged to lock the movable lifting element to the fixed base against movement. Thus it is possible to lock the movable lifting element in an upraised position with the locking member, so that a more stable connection is achieved when the vehicle is in an uplifted position. Preferably the locking member is adapted to lock the lifting element mechanically, giving a more stable, mechanical lock of the lifting element. This is advantageous during the turning of a wheel, since vibrations are then less prone to disturb the turning operation.

According to one embodiment of the invention the supporting frame comprises a holding member arranged to hold the lifting member in a retracted position in a first state, and to hold the lifting member in an extended position in a second state. Preferably the holding member is adapted to extend the lifting member in a direction towards lifting of the vehicle in the second state. Due to the limited space available beneath the vehicle it is important to save space as much as possible. By holding the lifting member closer to the vehicle in the second state than in the first state, the lifting member does not need to move the lifting element as far in order to lift the vehicle. Thus it is possible to decrease the height of the device both by making it possible to use a shorter lifting member and by the possibility to retract the lifting member, for example during mounting and dismounting of the device.

According to one embodiment of the invention the device comprises at least one locking member adapted to lock the lifting member from movement in a locked state, and at least one inner conical surface arranged to stabilize the locking member in its locked state. As the lifting member is pressed down due to the weight of the vehicle, the locking member is also pressed down into the conical surface, so that the locking member and the lifting member becomes centred and stabilized inside the conical surface.

According to a further embodiment the lifting member is arranged to be operated by pressure. By lifting the vehicle by using a lifting member driven by pressure heavy weights may be lifted, which is necessary in order to lift for example a heavily loaded cargo wagon. Preferably the lifting member comprises a piston moving in a cylinder. The pressure may be provided by an external device, such as a pump, or by a pump included in the lifting device. An external pump may also be connected with two or more lifting devices according to the invention for simultaneous and coordinated lifting. In one embodiment the lifting member is pneumatic so that the lifting member is operated by gas pressure. In another embodiment the lifting member is a hydraulic lifting member.

According to a further embodiment the device is arranged to rest detachably on the rail and on the ground, so that the device is movable. Hence, it is possible to bring the lifting device out in the field and lift a vehicle while far away from a service depot. Thus, the usability of the device is greatly improved.

According to one embodiment the device is designed to lift the rail-based vehicle in order to allow a turning of the wheels of the vehicle. Hence the supporting frame is adapted to be sufficiently stable to resist the vibrations created during the turning. In particular the supporting frame is adapted to resist shearing forces and moments associated with the turning of the wheel. The supporting frame is also preferably made in a stiff but tough material.

BRIEF DESCRIPTION OF THE DRAWINGS

The invention is now to be described as a non-limiting example of the invention with reference to the attached drawings.

DETAILED DESCRIPTION

Figure 1:
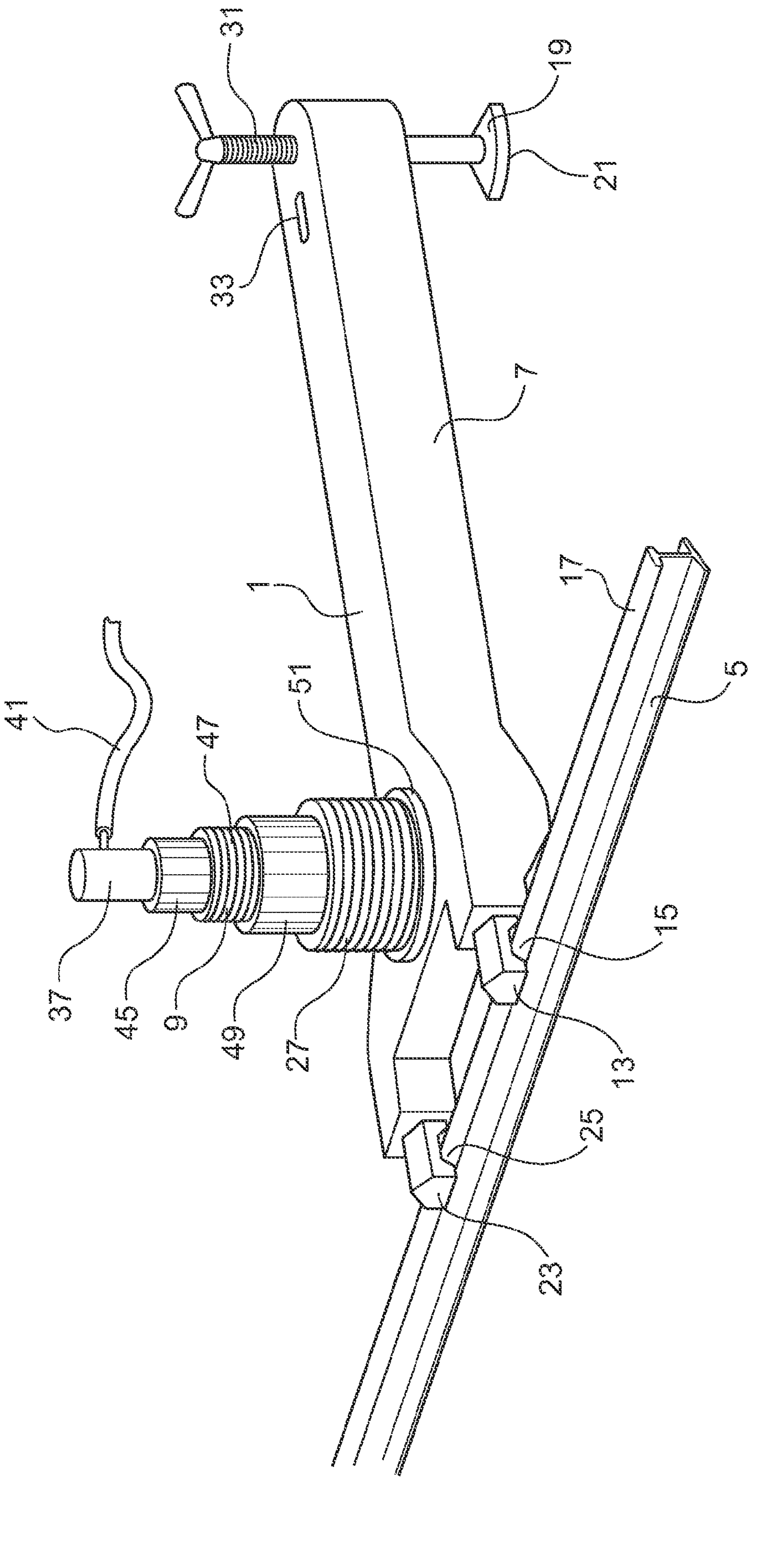
FIG. 1 shows a lifting device according to one example of the invention.
Figure 2A:
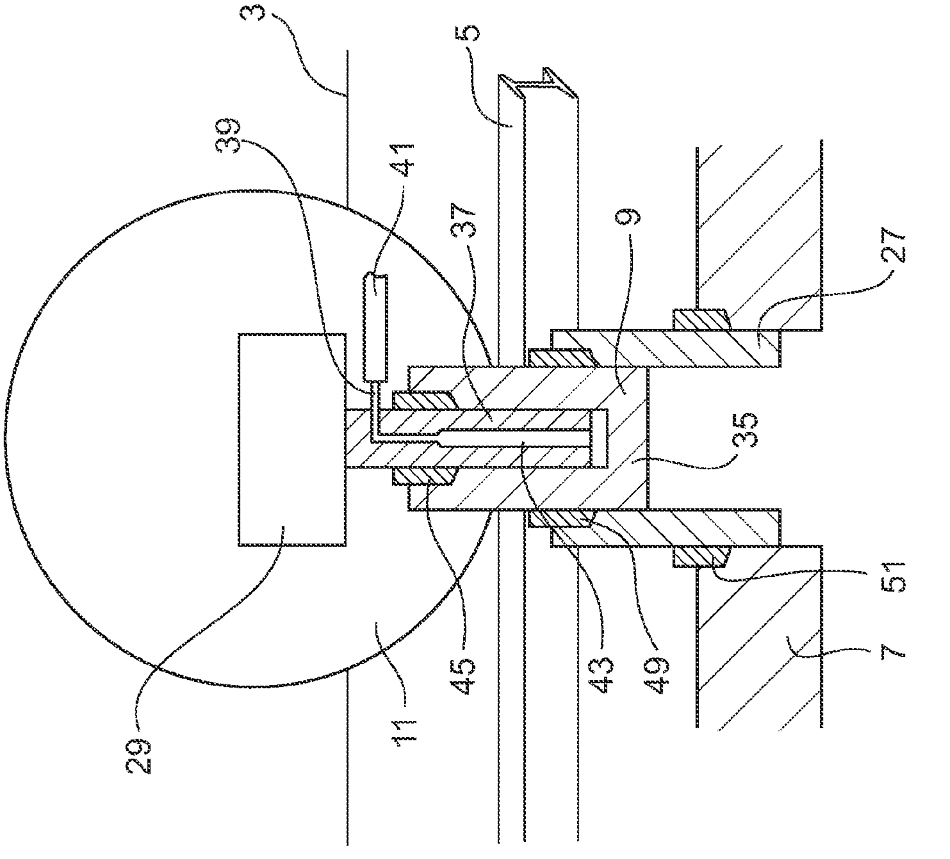
FIG. 2*a* shows a detailed view of a supporting frame holding a lifting member in a first, retracted position.
Figure 2B:
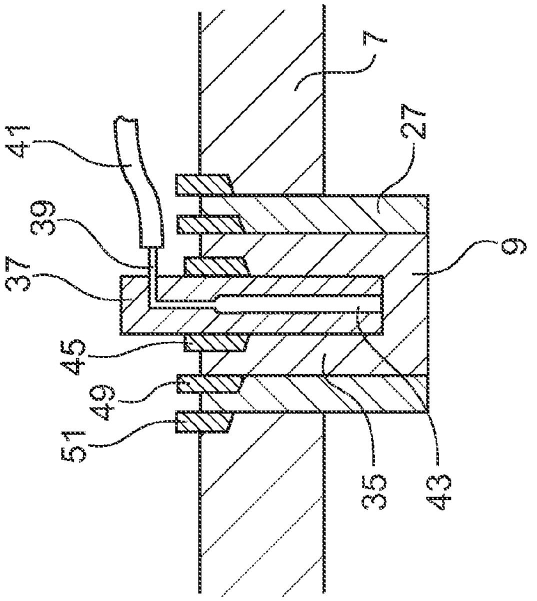
FIG. 2*b* shows a detailed view of a supporting frame holding a lifting member in a second, extended position.

In FIG. 1 and FIGS. 2*a-b* a device 1 for lifting a rail-based vehicle 3, while the vehicle 3 is standing on a rail 5 is shown. The device comprises a supporting frame 7 and a lifting member 9. The supporting frame 7 is arranged to hold the lifting member 9 securely so that the lifting member 9 can lift the vehicle 3. In this example the lifting member 9 is adapted to apply a lifting force on the rail-based vehicle 3 in order to lift at least one wheel 11 of the rail-based vehicle from the rail 5.

The device 1 comprises a first resting member 13 arranged to rest in a first position 15 on the rail 5. In this example the first resting member is adapted to rest on the head 17 of the rail. This point function as a reference, so that the height of the supporting frame 7 is known. Furthermore, at least some of the force loading the supporting frame when lifting a vehicle may be directed into the rail. This is advantageous since the rail is both dimensioned and adapted for receiving the weight of the vehicle. Furthermore, the rail is usually very stable, and thus a good base when turning the wheels.

The supporting frame 7 further comprises a second resting member 19 arranged to rest in at least a second position 21 on the ground. The rail 5, even if designed to carry heavy compressive loads, is not designed to withstand large moments or shearing forces, which may lead to that the rail breaks, in particular in its weak web. By arranging the second resting member 19 to rest on the ground and adapted to direct at least some of the force with which the vehicle affects the lifting device while being lifted down into the ground, forces and torques that might create moments or shearing forces in the rail 5 may instead be absorbed into the ground, which decreases the risk of damaging the rail.

The supporting frame 7 further comprises a third resting member 23 arranged to rest on the ground or on the rail in at least one third position 25. In this example the third resting member 23 is arranged to rest on the head of the rail 5. The supporting frame 7 is arranged so that the third resting member 23 is adapted to rest in a third position 25 displaced perpendicularly to and at a distance of at least 20 cm, preferably at least 25 cm, and in this example at least 30 cm, from a line through the first 15 and second positions 21. Thus the supporting frame 7 rests on the ground/rail in at least three positions, so that the supporting frame 7 becomes very stable. In particular the supporting frame 7 may absorb shearing forces, moments and torques and direct the forces into the ground and/or rail. Since the third point is not in line with the first and the second points, a triangular base is achieved, giving good stability.

The supporting frame 7 comprises a first holding member 27 adapted to hold and support the lifting member 9. In this example the first holding member 27 is adapted to hold and support the lifting member 9 in a position on a centre line passing in the middle between the first 13 and third 23 resting members. Thus the force loading the supporting frame when lifting the vehicle will be equally divided between the first and third resting members 13, 23.

The first holding member 27 is further adapted to hold and support the lifting member 9 in a position on one side of the rail. Preferably the first holding member 27 is adapted to hold and support the lifting member 9 in a position so that the lifting member is positioned to apply the lifting force onto a specifically designed lifting bracket on the vehicle. In this example the holding member 27 is adapted to hold the lifting member 9 in a position for applying the lifting force onto a wheel-box 29 of the vehicle. In this example the holding member 27 is adapted to hold the lifting member 9 at a fixed angle, which in this example is substantially perpendicular, relative to the supporting frame 7.

The first holding member 27 is further adapted to hold and support the lifting member 9 in a position closer to the first and third resting members 12, 23 than to the second resting member 19. Correspondingly, the supporting frame 7 is shaped so that the second resting member 19 is arranged at a greater distance from the holding member 27 than the first and third resting members 13, 23. Thus the force loading the supporting frame when lifting the vehicle will be mainly applied onto the first and third resting members 13, 23. This is advantageous since the rail is more stable than the ground. By reducing the load on the second resting member 19, the effect of the second resting member 19 slipping and/or sinking into the ground is decreased.

In this example the supporting frame 7 is shaped so that the distance between the first and third resting members 13, 23 and the lifting member 9 is between one fourth to one eight, preferably one fifth, of the distance between the second resting member 19 and the lifting member 9. In this example the lifting member is positioned between the resting members so that about 10-30% of the weight of the vehicle is carried into the ground and about 70-90% of the force is carried into the rail.

In this example the supporting frame also comprises an adjustment member 31 arranged for adjusting the vertical position of the second resting member 19 relative to the supporting frame 7. Thus the height and the angle of the supporting frame 7 relative to the ground and the horizontal are adjustable. This also means that by adjusting the second resting member 9 the lifting member 9 may be aligned with a desired lifting direction by changing the angle of the supporting frame 7. Furthermore, the distribution of the load forces over the resting members 13, 19, 23, may also be adjusted.

In this example the adjustment member 31 comprises a threaded rod arranged in a correspondingly threaded hole in the supporting frame 7. The threaded rod 31 is thus movable in a vertical direction by rotating the rod. The second resting member 19 is attached to the end of the rod.

The supporting frame 7 comprises a level measurement member 33 adapted to estimate the angle of the supporting frame relative to the horizontal and/or the vertical. Since the vertical and horizontal are always fixed relative to each other measuring one of them will simultaneously give information of the other. By adjusting the vertical height of the second resting member 19 with the adjustment member 31 the angle of the supporting frame 7 changes, which is then measured with the level measurement member 33. Hence, it is easier to adjust the angle of the supporting frame 7 to a desired angle so as to lift the vehicle at the desired lifting direction. Preferably the level measurement member comprises a bubble level 33, wherein an operator may easily align the supporting frame with the horizontal. Preferably the holding member 27 is also adapted to hold the lifting member 9 in a perpendicular direction relative to the level measurement member 33, so that when the level measurement member 33 measures alignment with the horizontal, the lifting member is aligned with the vertical. Naturally, it is also possible to arrange a level measurement member adapted to measure the vertical and align it with the lifting member directly.

The lifting member 9 comprises a fixed base 35 and a movable lifting element 37 arranged to move in relation to the fixed base 35 in order to apply the lifting force on and move the vehicle. In this example the lifting member 9 is driven by pressure, wherein the lifting member 9 may be for example hydraulic or pneumatic, and the lifting element 35 is a piston. The lifting member 9 thus comprises an inlet 39 connected with a tube or hose 41, and an inner chamber 43 in which the lifting element 35 is arranged to move. By either applying or increasing the pressure in the inner chamber 43 by use of the tube or hose 41, the piston can be controlled to move outwardly for lifting the vehicle, or inwardly for letting the vehicle down.

The lifting member 9 further comprises a first locking element 45 arranged to lock the movable lifting element 35 to the fixed base 33, so that the lifting element 35 becomes fixed in place. In this example the locking element 45 comprises a nut 45 arranged on a threading 47 arranged on the outer surface of the lifting element. By tightening the nut the lifting element becomes locked from downward movement. Thus it is possible to lock the movable lifting element in an upraised position with the locking element 45.

The holding member 27 is further arranged to hold the lifting member 9 in a retracted position in a first state, shown in FIG. 2*a*, and to hold the lifting member in an extended position in a second state, shown in FIG. 2*b*. The holding member 27 is arranged to hold the lifting member 9 extended in a direction towards lifting of the vehicle in the second state. The holding member 27 also comprises a second locking element 49 arranged to lock the lifting member 9 from movement in the first and the second states respectively. The second locking member 49 is in this example arranged in the same manner as the first locking member 45, but may of course be shaped in any other manner suitable for alternately locking together and allowing movement between two elements.

The supporting frame 9 is likewise arranged to hold the holding member 27 in a retracted position in a first state, shown in FIG. 2*a*, and to hold the holding member 27 in an extended position in a second state, shown in FIG. 2*b*. The supporting frame 7 also comprises a third locking element 51 arranged to lock the holding member 27 from movement in the first and the second states respectively. Thus the device comprises locking members 45, 49, 51 adapted to lock the lifting member 9 from movement in a locked state.

In this manner the lifting member 9 is arranged telescopically extendable in the lifting direction, wherein the working length for the lifting element 37 may be shortened. Also, by allowing retraction of the lifting member 9, it is possible to design the device 1 with smaller dimensions so that the device will fit underneath the vehicle. The device 1 may naturally comprise any number of intermediate holding members adapted to hold other holding members in a retracted and/or extended position in different states, so as to achieve a suitable length for the telescopic extension depending on the expected need.

The holding member 27 is further shaped with an inner surface arranged to hold the lifting member 9. The inner surface is also provided with a recess along the rim of the surface for providing room for the second locking element 49. When the locking element 49 locks the lifting member 9 against movement the locking member 49 at least partly reside within the recess. The recess is further provided with an inner, conical surface, and the locking member 49 is correspondingly provided with an outer conical surface. As the lifting member 9 is pressed down due to the weight of the vehicle during a lifting operation, the locking member 49 becomes centred and stabilized inside the cone. In this example both the supporting frame 7 and the fixed base 35 are similarly provided with such a recess having an inner, conical surface adapted for receiving the respective first 45 and third 51 locking members. Thus the device comprises inner conical surfaces arranged to stabilize the locking members 45, 49, 51 in their locked state.

When using the device 1 the lifting member 9 is first arranged in the first, retracted state, so that it is easy to move the device in position. The device is then arranged so that the first and third resting members are resting against the rail on either side of the wheel to be lifted. The lifting member 9 is then positioned directly under the wheel box 29.

Secondly, the adjustment member 31 is operated to move the second resting member to adjust the height of the support frame 7, until the level measurement member 33 shows that the support frame is arranged level with the horizontal. The lifting member is then simultaneously arranged parallel with the vertical, which normally is the desired lifting direction, unless the rail itself is tilted. The adjustment member 31 is also adapted for changing the position of the second resting member depending on the shape of the ground beside the rail. The rail-bed beside the rail may differ substantially from flat to steep, depending on the local topography.

Thirdly, the holding member 27 is extended by unlocking the locking member 51, pulling the holding member upwards, and again fastening the locking member. Similarly, the lifting member is extended by unlocking the locking member 49, pulling the lifting member upwards until the lifting element 37 make contact with or is very close to the wheel box, and fastening the locking member 49.

In a fourth step the first locking member 45 is unlocked, so that the lifting element 37 may move, and pressure is applied through the hose 41. The lifting element 37 moves upwards and lifts the vehicle a desired distance. The locking member 45 is then locked, so that the lifting element 37 becomes locked from movement. At this point the pressure inside the chamber 43 may be released, while the vehicle remain in the uplifted position due to the locking member 45. Since the lifting element 37 is held at its position by mechanical means rather than pneumatic or hydraulic the lifting device is more stable. Otherwise it may happen that the lifting element would move as the load changes, due to that the lifting force would be dependent on the pressure within the chamber 43.

In a fifth step the uplifted wheel is turned by a turning device. The turning device may be a separate turning device, or it may be integrated with the lifting device 1. Thus the device 1 is designed to lift the rail-based vehicle in order to allow turning of the wheels of the vehicle. The supporting frame 7 is designed to be sufficiently stable and resistant to the vibrations created during the turning of the wheel, so that the required tolerances may be met.

In a sixth step the pressure is once more applied to the lifting member 9, the locking member 45 is released, and the vehicle is let down by gently decreasing the pressure.

In a seventh step the remaining locking members 49, 51 are also released, the holding member 27 and the lifting member 9 are retracted to their first states, and the locking members 45, 49, 51 are fastened. The device 1 is removed from the rail by detaching the first 13 and third 23 resting members, and if necessary, the adjustment member 31 is operated to move the second resting member 19, so as to change the device 1 into a state suitable for transportation. Since the device 1 is arranged to be movable and also mountable directly onto a rail, without the need for a pit or similar, the lifting device 1 may be used anywhere out in the field. Naturally, the device 1 is equally usable in a repair shop, where the device 1 has the advantage of portability between different repair stations within the repair shop.

The supporting frame 7 is constructed from beams of a stiff and durable material, such as a metal or metal alloy. In another example the supporting frame may also comprise plates, pipes or other forms of construction elements giving a stable construction for the supporting frame.

The supporting frame 7 is arranged to connect the three resting members and the holding member with each other. In this example the supporting frame is substantially triangular, wherein the resting members are arranged at the points of a triangle, a shape giving a high stability for the supporting frame. In other examples the supporting frame may of course be shaped in any other geometrical or non-geometrical shape, such as a square shape.

The supporting frame may also comprise one or more clamping members adapted to clamp the supporting frame to the rail. Such clamping members could be helpful in hindering the supporting frame from sliding along the rail during the lifting of the vehicle. The clamping members should be detachable from the rail, so that the device may be movable between different locations.

The tube or hose 41 is preferably connected with a pressure supply, such as a pump or similar. Preferably the tube or hose is connected with either a water supply, wherein the lifting member is hydraulic, or an air supply, wherein the lifting member 9 is pneumatic. The pressure supply may also be a part of the lifting device, for example in the form of a hand-driven pump. The pressure supply may also be connected with two or more lifting devices 1 for simultaneous and coordinated lifting.

In this example both the first 13 and the third 23 resting members comprise resting surfaces adapted to rest against the head of the rail. In this example the resting surfaces are shaped with two sections bevelled with an angle between 35-50 degrees, and connected by a flat section. The bevelled surface sections are further angled so that the surfaces at least partly face each other. The resting surface is shaped so that the bevelled sections will be resting on the head of the rail. The resting surface is further shaped so that the flat section will avoid contact with the rail. In this manner the stability of the connection between the resting members and the rail will increase.

As will be realized, the invention is capable of other and different embodiments, and its several details are capable of modifications in various obvious respects, all without departing from the essence of the invention. There is within the scope of the invention, a device for lifting a rail-based vehicle (3) while the vehicle is standing on a rail (5), the device (1) comprising a supporting frame (7) adapted to at least in part rest on the rail, and a lifting member (9) mounted on the supporting frame and adapted to apply a lifting force on the rail-based vehicle (3) for lifting at least one wheel (11) of the rail-based vehicle from the rail (5), characterized in that the supporting frame (7) comprises a least a first resting member (13) arranged to rest in a first position (15) on the rail and a second resting member (19) arranged to rest in a second position (21) on the ground. The device may further be characterized in that the supporting frame (7) comprises a third resting member (23) arranged to rest on the ground or on the rail in a third position (25), which third position is displaced perpendicularly to and at a distance of at least 25 cm from a line through the first and the second positions. The third resting member (23) may be arranged to rest on the rail in the third position. The supporting frame (7) may comprise an adjustment member (31) arranged for adjusting the vertical position of the second resting member (19) relative to the supporting frame, so that the angle of the supporting frame relative to the horizontal is adjustable. A level measurement member (33) may be adapted to estimate the angle of the device (1) relative to the horizontal and/or vertical. The level measurement member (33) may comprise a bubble level. The supporting frame may comprise a holding member (27) adapted to support and hold the lifting member (9), which holding member is aligned with the level measurement member (33). The lifting member (9) may comprise a fixed base (35) and a movable lifting element (37) arranged to move in relation to the fixed base in order to apply the lifting force on and move the vehicle (3), wherein the lifting member (9) further comprises a locking element (45) arranged to lock the movable lifting element to the fixed base against movement. The supporting frame may comprise a holding member (27) arranged to hold the lifting member (9) in a retracted position in a first state, and to hold the lifting member (9) in an extended position in a second state. The device may further comprise at least one locking member (45, 49, 51) adapted to lock the lifting member from movement in a locked state, and at least one inner conical surface arranged to stabilize the locking member (45, 49, 51) in its locked state. The lifting member (9) may be operated by pressure. The device may be arranged so that the lifting member (9) is adapted to apply the lifting force against a wheel-box (29) of the vehicle. The device may be detachably mounted on the rail and on the ground, so that the device is movable between locations. The device (1) may lift the rail-based vehicle in order to allow turning of the wheels of the vehicle.

The invention is not limited to the embodiment shown but may be varied freely within the framework of the following claims.

The invention claimed is:

1. A device configured to be supported by a single rail and ground for lifting a rail-based vehicle while the vehicle is standing on rails, the device comprising: a supporting frame configured to rest on said single rail and the ground; and a lifting member mounted on the supporting frame and adapted to apply a lifting force on the rail-based vehicle for lifting at least one wheel of the rail-based vehicle from said single rail, wherein the supporting frame comprises first, second, and third resting members, with said first, second, and third resting members spaced apart from each other, said first and third resting members located at a first end of the supporting frame and configured to be disposed on said single rail, and said second resting member located at an opposite second end of the supporting frame and configured to be disposed on and axially movable with respect to said ground, wherein the lifting member comprises a fixed base and a movable fluid driven lifting element which is axially movable in relation to the fixed base in order to apply the lifting force on and move the vehicle, wherein the lifting member further comprises a locking element arranged to lock the movable lifting element to the fixed base against movement in a locked state when the lifting element has been extended.

2. The device of claim 1, wherein the first resting member is arranged to rest in a first position on the single rail, the second resting member is arranged to rest in a second position, and the third resting member is arranged to rest on the single rail in a third position, which the third position is displaced perpendicularly to and at a distance of at least 25 cm from a line through the first and the second positions.

3. The device of claim 1, wherein the supporting frame comprises an adjustment member arranged for adjusting a vertical position of the second resting member relative to the supporting frame, so that an angle of the supporting frame relative to a horizontal position is adjustable.

4. The device of claim 1, wherein the device comprises a level measurement member adapted to estimate the angle of the device relative to a horizontal position.

5. The device of claim 1, wherein the device comprises a level measurement member adapted to estimate the angle of the device relative to a vertical position.

6. The device of claim 1, wherein the device comprises a level measurement member comprising a bubble level.

7. The device of claim 1, wherein the supporting frame comprises a holding member adapted to support and hold the lifting member, which holding member is aligned with a level measurement member.

8. The device of claim 1, wherein the supporting frame comprises a holding member arranged to hold the lifting member in a retracted position in a first state, and to hold the lifting member in an extended position in a second state.

9. The device of claim 1, wherein the device comprises at least one locking member adapted to lock the lifting member from movement in a locked state, and at least one inner conical surface arranged to stabilize the locking member in its locked state.

10. The device of claim 8, wherein the device comprises at least one locking member adapted to lock the lifting member from movement in a locked state, and at least one inner conical surface arranged to stabilize the locking member in its locked state.

11. The device of claim 1, wherein the lifting member is arranged to be operated by pressure.

12. The device of claim 1, wherein the device is arranged so that the lifting member is adapted to apply the lifting force against a wheel-box of the vehicle.

13. The device of claim 1, wherein the device is arranged to be detachably mounted on the rail and on the ground, so that the device is movable between locations.

14. The device of claim 1, wherein the device is designed to lift the rail-based vehicle in order to allow turning of the wheels of the vehicle.

* * * * *